(12) United States Patent
Vonnahme et al.

(10) Patent No.: US 10,572,428 B2
(45) Date of Patent: Feb. 25, 2020

(54) BUS SYSTEM

(71) Applicant: BECKHOFF AUTOMATION GMBH, Verl (DE)

(72) Inventors: Erik Vonnahme, Salzkotten (DE); Christopher Pohl, Verl (DE)

(73) Assignee: Beckhoff Automation GmbH, Verl (DE)

( * ) Notice: Subject to any disclaimer, the term of this patent is extended or adjusted under 35 U.S.C. 154(b) by 0 days.

(21) Appl. No.: 15/928,044

(22) Filed: Mar. 21, 2018

(65) Prior Publication Data

US 2018/0210854 A1 Jul. 26, 2018

Related U.S. Application Data

(63) Continuation of application No. PCT/EP2016/073455, filed on Sep. 30, 2016.

(30) Foreign Application Priority Data

Oct. 2, 2015 (DE) .................. 10 2015 116 802

(51) Int. Cl.
G06F 13/40 (2006.01)
H04L 12/10 (2006.01)
(Continued)

(52) U.S. Cl.
CPC ..... G06F 13/4068 (2013.01); H01R 13/6691 (2013.01); H04L 12/10 (2013.01); H04L 12/40045 (2013.01)

(58) Field of Classification Search
None
See application file for complete search history.

(56) References Cited

U.S. PATENT DOCUMENTS 6,218,930 B1 * 4/2001 Katzenberg ............. H04L 12/10
340/12.32
8,156,251 B1 * 4/2012 Sorensen ............ G06F 11/1004
710/2

(Continued)

FOREIGN PATENT DOCUMENTS

DE 10163393 A1 7/2003
DE 102010061188 A1 1/2012
(Continued)

OTHER PUBLICATIONS

First Office Action for German Patent Application No. 10 2015 116 802.2, dated May 12, 2016 (33 pages).
(Continued)

Primary Examiner — Henry Tsai
Assistant Examiner — Christopher A Bartels
(74) Attorney, Agent, or Firm — Dorsey & Whitney LLP

(57) ABSTRACT

A microcontroller unit of an input/output module checks whether a communication connection can be set up from the microcontroller unit to a communication subscriber of a data cable plugged into the one portion of a electrical plug connection of the input/output module, wherein the microcontroller unit of the input/output module actuates DC voltage supplies of the input/output module such that the DC voltage supplies apply a respective DC voltage to applicable electrical contacts of electrical contact elements of the input/output module only if the check has revealed that a communication connection has been able to be set up to the communication subscriber of the data cable.

20 Claims, 8 Drawing Sheets

(51) Int. Cl.
*H04L 12/40* (2006.01)
*H01R 13/66* (2006.01)

(56) References Cited

U.S. PATENT DOCUMENTS

| | | | |
|---|---|---|---|
| 8,779,786 B2* | 7/2014 | Maniktala | H04L 12/12 |
| | | | 324/526 |
| 8,971,423 B1* | 3/2015 | Fu | H04K 1/10 |
| | | | 327/20 |
| 2003/0140274 A1* | 7/2003 | Neumiller | H04L 1/22 |
| | | | 714/24 |
| 2004/0073567 A1 | 4/2004 | Caveney et al. | |
| 2008/0150512 A1* | 6/2008 | Kawano | G06F 1/266 |
| | | | 323/351 |
| 2010/0244587 A1* | 9/2010 | Tiovola | G06F 13/4081 |
| | | | 307/130 |
| 2011/0217873 A1 | 9/2011 | Diab et al. | |
| 2012/0080212 A1* | 4/2012 | Gabriel | H04B 3/00 |
| | | | 174/34 |
| 2012/0262950 A1* | 10/2012 | Nate | H02J 9/005 |
| | | | 363/16 |
| 2013/0093444 A1 | 4/2013 | Maniktala et al. | |
| 2013/0223293 A1* | 8/2013 | Jones | H04L 5/14 |
| | | | 370/276 |
| 2015/0058642 A1* | 2/2015 | Okamoto | G06F 13/14 |
| | | | 713/300 |
| 2015/0312048 A1* | 10/2015 | Bodo | H02J 13/0062 |
| | | | 713/300 |
| 2016/0349295 A1* | 12/2016 | Banhegyesi | G01R 21/133 |
| 2016/0370204 A1* | 12/2016 | Spanier | G01D 4/002 |
| 2017/0012787 A1* | 1/2017 | Horvath | H04L 12/10 |
| 2017/0170734 A1* | 6/2017 | Sheng | H02M 3/33507 |
| 2017/0201724 A1* | 7/2017 | Galvin | G08B 13/1966 |
| 2017/0324195 A1* | 11/2017 | Eriksen | H02H 3/00 |
| 2018/0091639 A1* | 3/2018 | Soffer | H04M 1/68 |
| 2018/0295796 A1* | 10/2018 | Woytowitz | A01G 25/162 |

FOREIGN PATENT DOCUMENTS

| | | |
|---|---|---|
| DE | 102011087828 A1 | 6/2013 |
| WO | 2017055572 A1 | 4/2017 |

OTHER PUBLICATIONS

Notice of Allowance issued for German Patent Application No. 10 2015 116 802.2, dated Sep. 13, 2016 (21 pages).

* cited by examiner

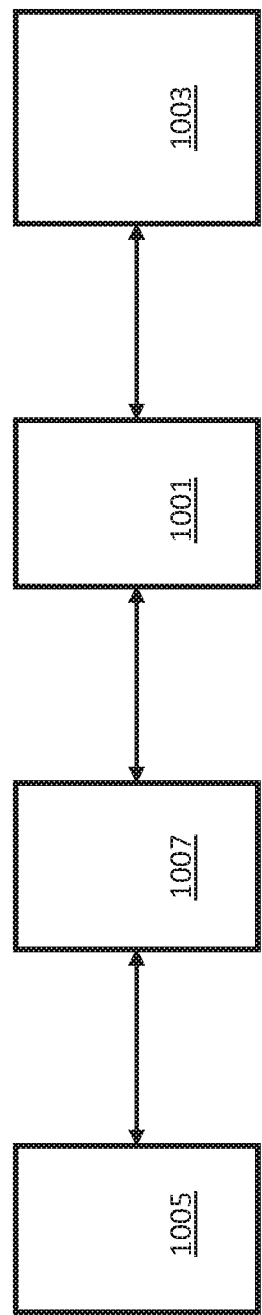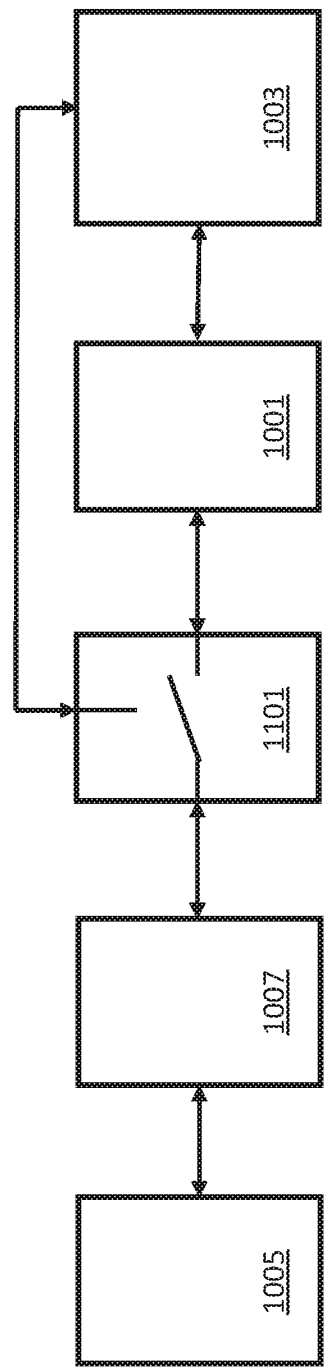

BUS SYSTEM

CROSS-REFERENCE TO RELATED APPLICATION

This patent application is a continuation of International Patent Application PCT/EP2016/073455, filed Sep. 30, 2016, which claims priority to German patent application DE 10 2015 116 802.2, filed Oct. 2, 2015, entitled BUS-SYSTEM, each of which are incorporated by reference herein, in their entireties and for all purposes.

FIELD

The invention relates to a bus system, an input/output module, a data cable and also to a method for operating an input/output module and to a computer program.

BACKGROUND

Modern concepts in industrial automation engineering, that is to say in the control and monitoring of technical processes using software, are based on the idea of a central control with a distributed sensor/actuator level. In this case, the subscribers communicate with one another and with superordinate systems via industrial data networks, subsequently also referred to as automation networks.

The Ethernet is the most widely used communication standard in local area networks (LANs) and is stipulated primarily by IEEE standard 802.3. The Ethernet is based on a LAN design, in which a plurality of control nodes, for example computers or machines, are connected to one another by cable, with the Ethernet protocol performing the encapsulation of the data to be transmitted in data packets, subsequently also referred to as a message, having a predetermined format. Different Ethernet variants can be used in this case that differ in terms of the transmission rate, the cable types used and the line encoding.

In the case of Ethernet networks used in industry, the communication between the subscribers normally travels via a data line having four wires, the four wires often being embodied as two twisted wire pairs. The twisting of the wire pairs reduces crosstalk. The two wires of a wire pair are always used together, with a differential data signal being transmitted via a respective wire pair. Sometimes, all four wires are also twisted together, which admittedly results in disadvantages for electromagnetic compatibility, but has the advantage of greater flexibility for the line.

A frequently imperative demand on automation networks is that the outputs of a machine, the actuators, can be put into a safe state at any time without losing the capability of monitoring the machine in the process. The sensors and the control in the automation network therefore need to be able to be operated independently of the actuators. For this reason, a power supply for the actuators is normally embodied separately from the power supply for the sensors or the control in order to perform a shutdown of the actuator supply independently of the sensor or control supply.

The power supply lines needed in the automation network are normally laid independently of the data line, this necessitating at least two dedicated wirings using the appropriate contact technology. In industrial automation, however, it is desirable to always achieve the most inexpensive and simple wiring possible in the automation network. This is important particularly when environmental needs mean that good shielding, a high protection class or high heat resistance is required for the wiring. The wiring is therefore often responsible for a relevant high proportion of the system costs.

One approach to save costs for the wiring involves combining the power supply and the data transmission in one wiring. It is thus possible to use the "Power over Ethernet" (PoE) standard to transmit a single voltage via a four-wire standard Ethernet data line in addition to the two differential data signals on the two twisted wire pairs as well. In the case of the PoE standard, this is accomplished by using a specially adapted Ethernet transformer that applies the two potentials required for the voltage to one wire pair each via a central tap. Since two separate power supplies are frequently required in industrial automation, however, one for the actuators and the other for the sensors or the control, even a PoE system with a four-wire data line requires additional wiring for a second power supply.

The concept of the PoE system can be transferred to automation engineering, so that a user can be provided with the capability of connecting automation engineering devices (for example input/output modules) to just one instead of the otherwise usual two lines (communication and power supply). To this end, the supply voltage and the data signal are transmitted on the same line and separated from one another by means of an electronic circuit.

Devices that have this technology cannot thus readily be connected to devices that do not have this technology, since the devices that do not have this technology would otherwise have a supply voltage applied to the communication components, which can lead to (irreparable) damage in the device.

The laid-open specification US 2013/0093444 A1 and the patent specification U.S. Pat. No. 6,218,930 B1 each show a way of detecting capabilities of remote devices.

SUMMARY

The invention provides an efficient concept by means of which it is possible to ensure that an input/output module does not provide a supply voltage via a data cable to a remote further input/output module connected to the input/output module via the data cable if the remote further input/output module is not configured to receive an electrical supply voltage via the data cable.

EXAMPLES

According to one aspect, a bus system is provided, comprising:
  a data cable having two wire pairs,
    wherein the data cable comprises a first portion of an electrical plug connection, the first portion comprising four first electrical contact elements, wherein
    the four first electrical contact elements are each electrically connected to one of the wires of the two wire pairs,
    wherein the data cable has a communication subscriber,
    an input/output module,
    wherein the input/output module has a first DC voltage supply, a second DC voltage supply, a physical interface, a first transformer, a second transformer, a first inductive assembly, a second inductive assembly, a first capacitive assembly, a second capacitive assembly and a second portion that is complementary to the first portion of the electrical plug connection, the second portion comprising four second electrical contact elements, wherein the four second electrical contact elements each comprise an electrical contact, wherein the first DC voltage supply is connected to a respective electrical contact of two of the four second electrical contact elements via the first inductive assembly, wherein the second DC voltage supply is connected to a respective electrical contact of two others of the four second electrical contact elements via the second inductive assembly, wherein the physical interface is connected to the respective electrical contacts of the two of the four second electrical contact elements via the first transformer and via the first capacitive assembly in order to apply a first differential data signal to the two electrical contacts of the two of the four second electrical contact elements, wherein the physical interface is connected to the respective electrical contacts of the two others of the four second electrical contact elements via the second transformer and via the second capacitive assembly in order to apply a second differential data signal to the two electrical contacts of the two others of the four second electrical contact elements, wherein the input/output module comprises a microcontroller unit, wherein the microcontroller unit is configured to communicate with the communication subscriber of the data cable, wherein the microcontroller unit is configured to actuate the first and second DC voltage supplies such that they apply a respective DC voltage to the applicable electrical contacts of the four second electrical contact elements only if the microcontroller unit has been able to communicate with the communication subscriber of the data cable, so that a respective DC voltage is not applied in the absence of the communication and/or in the absence of a communication subscriber in the data cable.

According to another aspect, an input/output module for a bus system is provided, comprising:
a first DC voltage supply, a second DC voltage supply, a physical interface, a first transformer, a second transformer, a first inductive assembly, a second inductive assembly, a first capacitive assembly, a second capacitive assembly and a portion of an electrical plug connection, the one portion comprising four electrical contact elements, wherein the four electrical contact elements each comprise an electrical contact, wherein the first DC voltage supply is connected to a respective electrical contact of two of the four electrical contact elements via the first inductive assembly, wherein the second DC voltage supply is connected to a respective electrical contact of two others of the four electrical contact elements via the second inductive assembly, wherein the physical interface is connected to the respective electrical contacts of the two of the four electrical contact elements via the first transformer and via the first capacitive assembly in order to apply a first differential data signal to the two electrical contacts of the two of the four electrical contact elements, wherein the physical interface is connected to the respective electrical contacts of the two others of the four electrical contact elements via the second transformer and via the second capacitive assembly in order to apply a second differential data signal to the two electrical contacts of the two others of the four electrical contact elements, wherein the input/output module comprises a microcontroller unit, wherein the microcontroller unit is configured to communicate with a communication subscriber of a data cable, wherein the microcontroller unit is configured to actuate the first and second DC voltage supplies such that they apply a respective DC voltage to the applicable electrical contacts of the four electrical contact elements only if the microcontroller unit has been able to communicate with the communication subscriber of the data cable, so that a respective DC voltage is not applied in the absence of communication and/or in the absence of a communication subscriber in the data cable.

According to a further aspect, a data cable for a bus system is provided, comprising:
two wire pairs,
a portion of an electrical plug connection, the one portion comprising four electrical contact elements,
wherein the four electrical contact elements are each electrically connected to one of the wires of the two wire pairs,
wherein the data cable has a communication subscriber for a communication with a microcontroller unit of an input/output module.

According to a further aspect, a method for operating the input/output module is provided, comprising the following steps:
using the microcontroller unit to check whether a communication connection can be set up from the microcontroller unit to a communication subscriber of a data cable plugged into the one portion of the electrical plug connection,
using the microcontroller unit to actuate the DC voltage supplies such that the DC voltage supplies apply a respective DC voltage to the applicable electrical contacts of the contact elements only if the check has revealed that a communication connection has been able to be set up to a subscriber of the data cable.

BRIEF DESCRIPTION OF THE DRAWINGS

The invention will be explained in more detail below with reference to figures, in which, in each case in a schematic illustration:

FIG. 4 shows a block diagram of an Ethernet interface connection.
FIG. 5 shows a block diagram of a switchable Ethernet interface connection.

DETAILED DESCRIPTION

Figure 1:
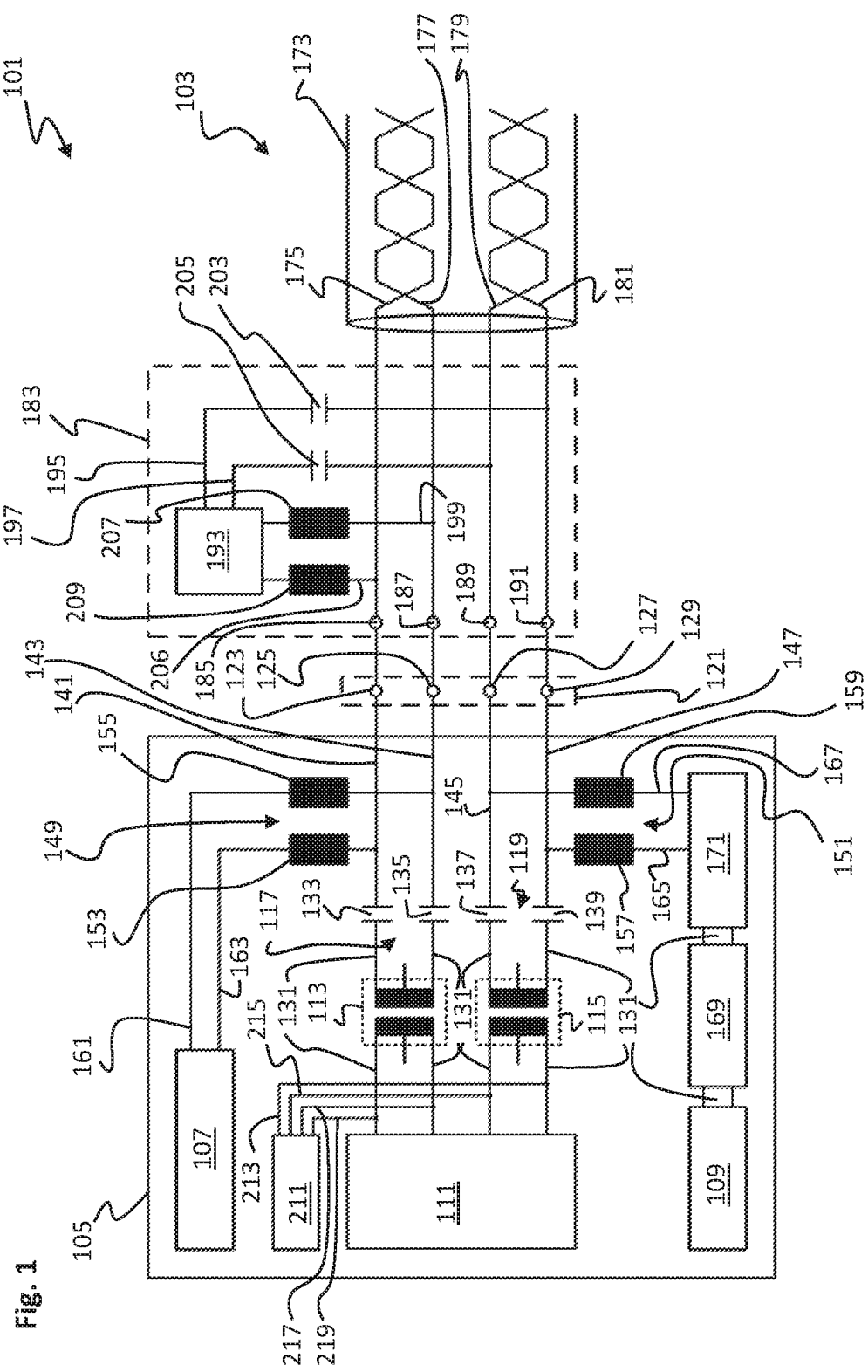
FIG. 1 shows a bus system.

The present invention comprises particularly and inter alia the notion of providing a communication subscriber in the data cable that is plugged into the second portion of the electrical plug connection, for example into a socket, of the input/output module. In this respect, the microcontroller unit can advantageously communicate with the communication subscriber of the data cable. If such a communication has been able to take place, that is to say particularly if a communication subscriber is present, then, this is a sign for the microcontroller unit that a further input/output module that is, or has already been, connected to the input/output module by means of the data cable can receive both differential data signals and DC voltages via the data cable without the further input/output module being damaged or destroyed on account of the applied or transmitted DC voltages. The microcontroller unit thus assumes, when there is a communication subscriber present in the data cable, that the further input/output module has what is known as a "Power over Ethernet" functionality.

If there is no communication subscriber present in the data cable, however, the microcontroller unit is also unable to set up a communication to such a communication subscriber. In this respect, no communication can take place between the microcontroller unit and a communication subscriber. This is then a sign for the microcontroller unit that the further input/output module that has already been, or is, connected to the input/output module by means of the data cable does not have a "Power over Ethernet" functionality, that is to say cannot be provided with a DC voltage via the data cable, since otherwise the further input/output module could be damaged or destroyed. In such a case, the microcontroller unit then actuates the two DC voltage supplies such that they do not apply a respective DC voltage to the electrical contacts of the four second contact elements.

Therefore, the presence of a communication subscriber in the data cable is thus used to define or prescribe a criterion based on which it is possible to efficiently determine or ascertain whether DC voltages can also be transmitted via the data cable. Therefore, it is thus possible to efficiently ensure that the input/output module is not provided a supply voltage via the data cable to a remote further input/output module connected to the input/output module via the data cable if the remote further input/output module is not configured to receive an electrical supply voltage via the data cable. It is therefore in particular advantageously possible to prevent damage to the remote further input/output module or destruction of the remote further input/output module.

According to one embodiment, the bus system is configured for use in industrial automation. According to one embodiment, the bus system is therefore a bus system from industrial automation or a bus system for industrial automation.

The input/output module is thus particularly configured to provide both differential data signals and a voltage supply via a four-wire data cable. The provision of the inductive and capacitive assembly means that it is advantageously possible to apply two DC isolated DC voltages to the four wires of the data cable. Using just a single wiring, that is to say the data cable, it is thus advantageously possible for two DC isolated DC currents in addition to two differential data signals to be transmitted on the two wire pairs of the data cable in parallel. A functionality of the bus system is thus not altered, which means that any bus structures such as star, line or ring are possible and are also provided as such according to other embodiments.

Using the two DC isolated DC currents carried via the four-wire data cable, it is advantageously possible for a separate power supply to be ensured for actuators and/or sensors and/or a control. Therefore, it is advantageously possible for the actuator supply to be shut down independently of the sensor or control supply, which means that the imperative demand in industrial automation networks, to be able to put the outputs of a machine, that is to say the actuators, into a safe state at any time without interrupting the communication with the machine in the process, that is to say to be able to continue to address the sensors or the control, can be complied with.

Therefore, for example, a bus system is advantageously provided that comprises multiple input/output modules, these multiple input/output modules being able to have different functionalities: some of these input/output modules can have what is known as a "Power over Ethernet (PoE)" functionality, that is to say that a voltage supply can be provided via the four wires of the data cable that also transmit the data signals. Others of the input/output modules do not have a PoE functionality of this kind and can nevertheless be connected to input/output modules with PoE functionality without sustaining damage. This connection is possible, particularly as a result of suitable mechanical manifestations of plugs and sockets, only by means of data cables without a communication subscriber, which means that the supply voltages are not switched on.

That is to say, then, in particular, that the invention provides for the data cable to be used to identify the connected subscriber, that is to say the further input/output module connected to the input/output module according to the invention, in regard to whether or not the input/output module according to the invention can provide the further input/output module with a DC voltage via the four wires. That is to say, then, in particular, that based on the data cable, a decision is made as to whether or not the remote subscriber can be supplied with DC voltages. The presence of a communication subscriber, or a successful communication between the microcontroller unit and the communication subscriber, causes the remote subscriber to be able to be supplied.

According to one embodiment, the first differential data signal and the second differential data signal are each differential Ethernet signals. The bus system, or the input/output module, is therefore particularly suitable for use with Ethernet as the communication standard in the automation network. Therefore, according to one embodiment, an automation network is provided that comprises the bus system.

In one embodiment of the bus system, there is provision for the first portion of the electrical plug connection to be configured as a plug comprising the four first electrical contact elements, the four first electrical contact elements each being configured as an electrical contact pin, wherein the second portion of the electrical plug connection is configured as a socket having the four second electrical contact elements, the four second electrical contact elements each being configured as a contact cup, or vice versa.

In one embodiment of the input/output module, there is provision for the one portion of the electrical plug connection to be configured as a plug comprising the four electrical contact elements, the four electrical contact elements each being configured as an electrical contact pin, or for the one portion of the electrical plug connection to be configured as a socket having the four electrical contact elements, the four electrical contact elements each being configured as a contact cup.

In one embodiment of the data cable, there is provision for the one portion of the electrical plug connection to be configured as a plug comprising the four electrical contact elements, the four electrical contact elements each being configured as an electrical contact pin, or for the one portion of the electrical plug connection to be configured as a socket having the four electrical contact elements, the four electrical contact elements each being configured as a contact cup.

For the purpose of better distinguishability, when an embodiment of the bus system is described, the one portion of the electrical plug connection of the data cable is referred to as the first portion and the four electrical contact elements of the data cable are referred to as four first electrical contact elements, the one portion of the electrical plug connection of the input/output module being referred to as the second portion and the four electrical contact elements of the input/output module being referred to as four second electrical contact elements.

When, in an embodiment below, the data cable has the plug and the input/output module has the socket, the opposite case is always intended to be inferred, that the data cable has the socket and the input/output module has the plug.

According to one embodiment, there is provision for the microcontroller unit to be connected to the respective electrical contacts of the two of the four second electrical contact elements via the first transformer and the first capacitive assembly and/or to the respective electrical contacts of the other two of the four second electrical contact elements via the second transformer and the second capacitive assembly in order to be able to apply data signals for a communication with the communication subscriber to the applicable electrical contacts, wherein the communication subscriber is connected to at least one of the four wires of the two wire pairs in order to be able, in the plugged-in state, to receive the data signals of the microcontroller unit and/or to send data signals to the microcontroller unit via the at least one wire.

This gives rise to particularly the technical advantage that the microcontroller unit can communicate efficiently with the communication subscriber via at least one wire. The communication with the communication subscriber is therefore wired or line-based communication.

According to one embodiment, there is provision for the communication subscriber to be connected to the one of the two wire pairs via a third capacitive assembly and to the other of the two wire pairs via a third inductive assembly.

This gives rise to particularly the technical advantage that the property as a low-pass filter means that the inductive assembly ensures that the communication subscriber and a further remote input/output module connected to the input/output module by means of the data cable do not interfere with one another in their communication with the input/output module or microcontroller unit.

Data signals that are provided for the further input/output module are therefore advantageously largely filtered out by means of the third inductive assembly and can therefore no longer reach the communication subscriber, which could otherwise lead to communication with interference.

The provision of the third capacitive assembly advantageously allows efficient capacitive coupling of data signals transmitted by the microcontroller unit into the communication subscriber. The third capacitive assembly can therefore advantageously be used to configure a communication channel from the microcontroller unit to the communication subscriber.

According to one embodiment, there is provision for the microcontroller unit to be configured to apply a supply voltage for the communication subscriber to electrical contacts of the second electrical contact elements, the supply voltage being lower than the DC voltages that can be applied to the electrical contacts of the second electrical contact elements by means of the first and second DC voltage supplies. The supply voltage applied by means of the microcontroller unit can subsequently also be referred to as a measurement voltage.

This gives rise to particularly the technical advantage that any incompatible communication subscriber is not destroyed. The supply voltage or measurement voltage additionally advantageously allows the communication subscriber to be supplied with electric power. Thus, said communication subscriber does not need to have a separate current or voltage supply. The measurement voltage is preferably no more than 5 V.

In another embodiment, there is provision for the microcontroller unit to be configured to send a standby signal to the communication subscriber, wherein the communication subscriber is configured to change to a standby state in response to the standby signal.

This gives rise to particularly the technical advantage that an energy consumption of the communication subscriber can be lowered or reduced. In particular, it is therefore advantageously possible, in a normal mode of the bus system, to prevent an active communication subscriber, that is to say a communication subscriber that is switched on or not switched off, from being able to interfere with communication between the input/output module and the further input/output module. The standby state can also be referred to as a deep sleep mode.

According to one embodiment, there is provision for the microcontroller unit to be configured to send a wakeup signal to the communication subscriber, the communication subscriber being configured to wake up from a standby state in response to the wakeup signal. Thus, waking up means particularly that the communication subscriber is ready for communication with the microcontroller unit again.

This gives rise to particularly the technical advantage that the communication subscriber can be woken up efficiently in order to be available for communication with the microcontroller unit again. However, this is only when it has received the wakeup signal.

According to a further embodiment, there is provision for the communication subscriber to comprise a data memory that stores an electronic datasheet of the communication subscriber, wherein the microcontroller unit is configured to read the electronic datasheet from the data memory and to control operation of the input/output module based on the read datasheet.

This gives rise to particularly the technical advantage that the operation of the input/output module can be controlled efficiently. The reason is that control or operation of the input/output module can therefore be optimally attuned to the specifically used data cable.

Usually, communication between the input/output module and a further input/output module is, in particular, dependent on properties of the data cable that connects the two input/output modules to one another. For example, longer cables normally cause greater attenuation of the transmitted data signals than shorter cables. Thus, provided that such knowledge is available, this can be efficiently taken into consideration in the communication to the effect that a communication can be adapted to suit different cable lengths.

According to one embodiment, the electronic datasheet comprises one or more of the following features: compatibility information, electrical property, mechanical property.

The compatibility information particularly indicates whether or not the remote further input/output module is configured to receive a DC voltage or DC voltages via the four wires of the data cable.

An electrical property is, for example, an attenuation, a frequency response, a maximum current or a maximum voltage that can be transmitted via the wires of the data cable, or an insulation resistance. In particular, several of the aforementioned electrical properties are covered by the datasheet.

A mechanical property is, for example, a piece of length information or a piece of cross section information, that is to say a length or cross section indication for the data cable, a minimum bend radius of the data cable, an external diameter, a tow chain suitability or a resistance to environmental influences and/or chemicals. The resistance is defined according to an IP protection class, for example. The tow chain suitability indicates, for example, whether the data cable can be routed individually or together with other cables inside a flexible cable duct—the tow chain or a power feed chain—and has sufficient movement robustness, in particular, therefor.

In particular, there is provision for several of the aforementioned mechanical properties to be covered by the datasheet.

According to one embodiment, there is provision for the communication subscriber to be configured as a further microcontroller unit or as a programmable read-only memory.

The provision on a further microcontroller unit as a communication subscriber gives rise to particularly the technical advantage that normally a microcontroller unit has the capability of dropping into a deep sleep mode (standby mode) after a communication and therefore on no account interfering with a communication between the input/output module and the further input/output module. Further, the further microcontroller unit can advantageously record fundamental information, this also being to be able to be referred as logging, for example the number of tow chain cycles, switching-on cycles, the temperature or the input/output modules to which the data cable had been connected to date (for example type and/or serial number of the input/output modules to which the data cable had been connected to date).

The provision of a programmable read-only memory as a communication subscriber gives rise to particularly the technical advantage that a simple electrical component is used as a communication subscriber. A programmable read-only memory is normally advantageously a component that is simple to manufacture, which, furthermore, is also inexpensive. Furthermore, a programmable read-only memory is normally of technically less elaborate configuration than a microcontroller unit, that is to say has a lower level of technical complexity. This makes a read-only memory particularly robust and not very fault prone.

A programmable read-only memory is referred to as a PROM. According to one embodiment, the read-only memory is configured as an erasable programmable read-only memory. An erasable programmable read-only memory of this kind is referred to as an EPROM. According to one embodiment, the read-only memory is configured as an electrically erasable programmable read-only memory. An electrically erasable programmable read-only memory of this kind is referred to as an EEPROM.

Embodiments vis-à-vis the bus system and the input/output module and the data cable and the method are obtained analogously from corresponding embodiments vis-à-vis the method and the data cable and the input/output module and the bus system, respectively.

According to one embodiment, there is provision for the input/output module to be configured or set up to carry out or perform the method for operating an input/output module.

The data cable for a bus system is, according to one embodiment, the data cable from the bus system according to the invention.

According to one embodiment, the input/output module is the input/output module of the bus system according to the invention.

According to one embodiment, there is provision for the microcontroller unit to be connected to the respective electrical contacts of the two of the four second electrical contact elements via the first transformer and the first capacitive assembly and/or to the respective electrical contacts of the other two of the four second electrical contact elements via the second transformer and the second capacitive assembly in order to be able to apply data signals for a communication with the communication subscriber to the applicable electrical contacts.

According to a further embodiment, there is provision for the microcontroller unit to be configured to apply a supply voltage for the communication subscriber to electrical contacts of the electrical contact elements, the supply voltage (also called measurement voltage) being lower than the DC voltages that can be applied to the electrical contacts of the electrical contact elements by means of the first and second DC voltage supplies. Alternatively, according to one embodiment, there is provision for the two voltages (measurement voltage and supply voltage) to be the same, an electric current corresponding to the respective voltage being different in a further embodiment. The measurement current is limited to safe values in order to rule out destruction. The supply current is larger than the measurement current.

According to a further embodiment, there is provision for the microcontroller unit to be configured to send a standby signal to the communication subscriber.

According to another embodiment, there is provision for the microcontroller unit to be configured to read an electronic datasheet from a data memory of the communication subscriber and to control operation of the input/output module based on the read datasheet.

In a further embodiment, there is provision for the communication subscriber to be connected to at least one of the four wires of the two wire pairs in order to be able, in the plugged-in state, to receive the data signals of the microcontroller unit and/or to send data signals to the microcontroller unit via the at least one wire.

In another embodiment, there is provision for the communication subscriber to be connected to the one of the two wire pairs via a third capacitive assembly and to the other of the two wire pairs via a third inductive assembly.

According to another embodiment, there is provision for the communication subscriber to be configured to change to a standby state in response to a standby signal.

According to a further embodiment, there is provision for the communication subscriber to be configured as a further microcontroller unit or as a programmable read-only memory.

The electronic datasheet comprises, according to one embodiment, parameters for determining the supply voltage(s). Parameters are, for example: voltage, maximum continuous electric current, maximum electric overcurrent, maximum electrical power, type of the supply voltage (AC or DC).

That is to say that, according to one embodiment, the reading of the datasheet comprises the parameters being read in order to determine and then accordingly to apply the supply voltage(s).

The electronic datasheet comprises, according to one embodiment, a type of the data cable. The type of the data cable (data cable type) can advantageously be used to determine which data transmission method is meant to be used (cf. explanations below in connection with FIGS. 6 to 9).

The data cable also comprises, according to one embodiment, one or more further wires in addition to the four wires. These further wires can be used to provide additional supply voltage (for example AC voltages), for example. These additional supply voltages are, in a further embodiment, parameterized using parameters that are stored in the electronic datasheet, for example. The parameters are the parameters described above, for example.

For example, according to one embodiment, a plug pin assignment or a plug configuration is based on the EtherCATp plug.

In one embodiment, the electronic datasheet is read by two subscribers (input/output module and a further remote input/output module) that are connected to two cable ends of the data cable (that is to say are connected to one another by means of the data cable). For this purpose, an access mechanism or an access method (for example CSMA/CD: "Carrier Sense Multiple Access/Collision Detection") is provided, for example.

That is to say that a basic notion according to the invention can be regarded particularly as being that the electronic datasheet prescribes parameters and/or information based on which a decision is made concerning which data transmission method is used between the two subscribers, for example.

Subsequently, the same reference symbols are used for the same features.

Moreover, for the sake of clarity, all the drawings do not always show all the features. In some cases, a wild card in the form of a geometrical object is used for a group of features, for example.

FIG. 1 shows a bus system 101.

The bus system 101 comprises a data cable 103 and an input/output module 105.

The data cable 103 and the input/output module 105, although shown together in the figures, are also disclosed separately as such.

The input/output module 105 comprises a first DC voltage supply 107 and a second DC voltage supply 109. The first DC voltage supply 107 can supply a DC voltage to one or more sensors and/or to a bus, for example. That is to say, then, that the first DC voltage supply 107 is configured as a sensor and a bus supply, for example, or is used for a sensor and bus supply.

The second DC voltage supply 109 can supply to an actuator system, for example. That is to say, then, that the second DC voltage supply 109 is used for an actuator system supply, or is configured as an actuator system supply.

The input/output module 105 comprises a physical interface 111 that is configured as what is known as an Ethernet Physical Layer (PHY). The physical interface 111 undertakes encoding and decoding of data. The physical interface 111 therefore provides a first and a second differential data signal that can be transmitted via the data channel 103, as explained in more detail below.

The input/output module 105 comprises a socket 121 comprising four contact cups that each have an electrical contact 123, 125, 127, 129.

The input/output module 105 further comprises a first transformer 113 and a second transformer 115. The first differential data signal is transmitted via the first transformer 113 to the two electrical contacts 123, 125 of the socket 121. The second differential data signal is transmitted from the physical interface 111 via the second transformer 115 to the electrical contacts 127, 129 of the socket 121.

Further, the input/output module 105 comprises a first capacitive assembly 117 and a second capacitive assembly 119. The first capacitive assembly 117 comprises two capacitors 133, 135. The second capacitive assembly 119 comprises two capacitors 137, 139.

In this case, the first capacitive assembly 117 is connected between the first transformer 113 and the two electrical contacts 123, 125 of the socket 121. The second capacitive assembly 119 is connected between the second transformer 115 and the two electrical contacts 127, 129 of the socket 121.

To allow better distinction, the electrical contact 123 is referred to as the first electrical contact. The electrical contact 125 is referred to as the second electrical contact. The electrical contact 127 is referred to as the third electrical contact. The electrical contact 129 is referred to as the fourth electrical contact. The physical interface 111 is connected to the first transformer 113 by means of two electrical lines 131. The first transformer 113 is connected to each of the two capacitors 133, 135 of the first capacitive assembly 117 by means of two electrical lines 131. That is to say that one electrical line 131 runs from the first transformer 113 to the capacitor 133. An electrical line 131 further runs from the first transformer 113 to the capacitor 135.

The capacitor 133 is then connected to the first electrical contact 123 by means of an electrical line 141. The capacitor 135 is connected to the second electrical contact 125 by means of an electrical line 143.

Analogously to the first transformer 113, the second transformer 115 is also connected to the physical interface 111 by means of two electrical lines 131. An electrical line 131 further connects the second transformer 155 to the capacitor 137 of the second capacitive assembly 119. An electrical line 131 further connects the second transformer 115 to the capacitor 139 of the second capacitive assembly 119.

The capacitor 137 is then connected to the third electrical contact 127 by means of an electrical line 145. The capacitor 139 is connected to the fourth electrical contact 129 by means of a line 147.

Therefore, the physical interface 111 is connected to two of the four electrical contacts of the socket 121 via the first transformer 113 and via the first capacitive assembly 117 in order to, or to be able to, apply a first differential data signal to the two electrical contacts 123, 125.

The physical interface 111 is additionally connected to the two respective electrical contacts 127, 129 of the two others of the four electrical contacts, that is to say to the third electrical contact 127 and to the fourth electrical contact 129 of the socket 121, via the second transformer 115 and via the second capacitive assembly 119 in order to apply a second differential data signal to the two electrical contacts 127, 129.

The input/output module 105 further comprises a first inductive assembly 149 and a second inductive assembly 151. The first inductive assembly 149 comprises two inductances 153, 155, which are configured as coils, for example.

The second inductive assembly 151 comprises two inductances 157, 159, which are configured as coils, for example. The first DC voltage supply 107 is connected to the electrical line 143 and therefore to the second electrical contact 125 by means of an electrical line 161. In this case, there is provision for the inductance 155 of the first inductive assembly 149 to be connected in the electrical line 161.

The first DC voltage supply 107 is further connected to the electrical line 141 and therefore to the first electrical contact 123 by means of an electrical line 163. In this case, the inductance 153 of the first inductive assembly 149 is connected in the electrical line 163.

Therefore, the first DC voltage supply 107 is connected to the two electrical contacts 123, 125 of the socket 121 via the first inductive assembly 149. Therefore, the first DC voltage supply 107 can apply a DC voltage to the two electrical contacts 123, 125.

The second DC voltage supply 109 is connected to a low-bounce switch 169 by means of two lines 131. The low-bounce switch 169 is connected to a current limiting unit 171 by means of two lines 131. The current limiting unit 171 is connected to the electrical line 147 and therefore to the fourth electrical contact 129 by means of an electrical line 165. The current limiting unit 171 is further connected to the electrical line 145 and therefore to the electrical contact 127 of the socket 121 by means of a line 167.

The line 165 has the inductance 157 of the second inductive assembly 151 connected in it. The line 167 has the inductance 159 of the second inductive assembly 151 connected in it.

Therefore, the second DC voltage supply 109 for the actuator system is thus connected to the third electrical contact 127 and the fourth electrical contact 129 indirectly via the low-bounce switch 169 and the current limiting unit 171 via the second inductive assembly 151. As a result, it is thus possible for the second DC voltage supply 109 to apply a DC voltage to the two electrical contacts 127, 129. Therefore, the second DC voltage supply 109 is thus connected to two electrical contacts 127 via the second inductive assembly 151 in order to be able to apply a DC voltage to said electrical contacts.

The low-bounce switch 169 is, according to a more general embodiment, configured as a switch. The provision of such a switch, particularly a switch 169, is necessary particularly for the use of the bus system 101 in industrial automation in order to design a power supply for the actuators in the bus system to be connectable via the data cable 103. Therefore, it is advantageously possible for an actuator system to be shut down independently of a sensor and bus supply. The shutdown of the actuator supply allows the actuators in the automation network to be put into a safe state without needing to interrupt a communication in the process. The sensors or a control of the automation network can continue to be supplied with a DC voltage via the first DC voltage supply 107.

The fact that the switch, for example according to one embodiment, is configured as low-bounce switch 169 gives rise to particularly the technical advantage that it is possible to prevent the switch from repeatedly closing and opening when operated on account of a mechanical design. Such repeated closing and opening can lead to increased contact wear and hence to rapid failure, particularly if high overcurrents arise at the same time. The low-bounce switch 169 is configured as a semiconductor relay, for example.

The current limiter or the current limiting unit 171 advantageously gives rise to the ability to prevent switching processes of the actuator supply from interfering with a data communication via the data cable 103. The current limiting unit 171 can thus advantageously be used to prevent a large starting current, briefly occurring during the switching-on process, in a load module connected downstream of the input/output module 105 via the data cable 103 from exceeding an admissible saturation current for the inductances 157, 159 of the second inductive assembly 151, which means that the inductances 157, 159 would lose their inductive properties completely. As a result, a differential data signal that would be applied to the electrical contacts 127, 129, for example, could be hugely influenced, which would interfere with a communication.

In embodiments, the low-bounce switch 169 and the current limiting unit 171 are not provided.

The data cable 103 comprises a sheath 173 in which four wires 175, 177, 179, 181 run. The sheath 173 causes electrical insulation of the four wires 175, 177, 179, 181 from an environment of the data cable 103 and at the same time acts as a shield, for example.

The four wires 175, 177, 179, 181 form two wire pairs. In this case, the wires 175, 177 are configured as a twisted wire pair that can subsequently also be referred to as a first wire pair. The wires 179, 181 are configured as a twisted wire pair that can subsequently also be referred to a second wire pair.

Figure 2:
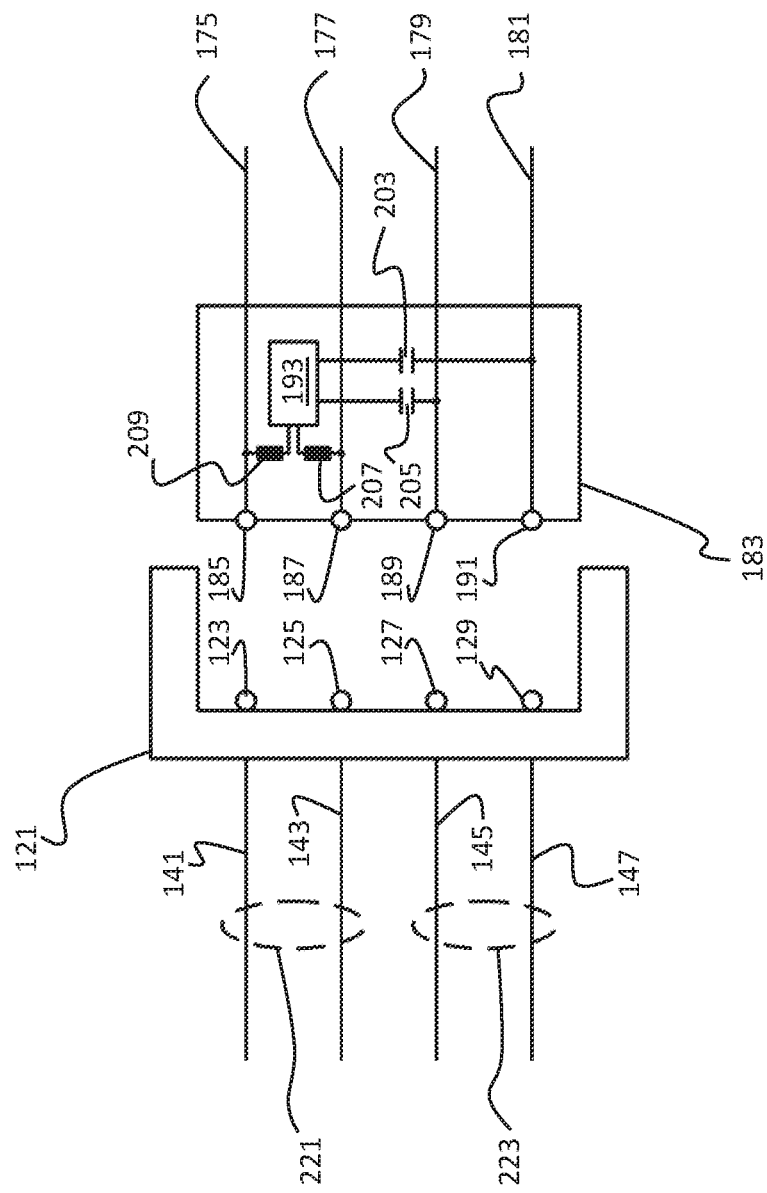
FIG. 2 shows an enlarged detail from the bus system of FIG. 1.

The data cable 103 further comprises, as shown in FIG. 2, a plug 183. The plug 183 comprises four electrical contact pins 185, 187, 189, 191. A geometrical arrangement and size of the electrical contact pins 185, 187, 189, 191 are configured in accordance with the geometrical size of the socket 121 and the arrangement of the electrical contacts 123, 125, 127, 129. That is to say, then, that the plug 183 is configured to be plugged into the socket 121, or that the socket 121 is configured to receive the plug 183.

In the plugged-in state, the electrical contact pins 185, 187, 189, 191 make contact with the four electrical contacts 123, 125, 127, 129.

To allow better distinction, the electrical contact pin 185 is referred to as the first electrical contact pin. The electrical contact pin 187 is referred to as the second electrical contact pin. The electrical contact pin 189 is referred to as the third electrical contact pin. The electrical contact pin 191 is referred to as the fourth electrical contact pin.

In the plugged-in state, the first electrical contact pin 185 makes contact with the first electrical contact 123. The second electrical contact pin 187 makes contact with the second electrical contact 125 in the plugged-in state. The third electrical contact pin 189 makes contact with the third electrical contact 127 in the plugged-in state. The fourth electrical contact pin 191 makes contact with the electrical contact 129 in a plugged-in state.

The wire 175 of the first wire pair is connected to the first electrical contact pin 185. The wire 177 of the first wire pair is connected to the second electrical contact pin 187. The wire 179 of the second wire pair is connected to the third electrical contact pin 189. The wire 181 of the second wire pair is connected to the fourth electrical contact pin 191.

Therefore, it is thus possible for a DC voltage applied to the two electrical contacts 123, 125 to be transmitted via the first wire pair in the plugged-in state. A DC voltage applied to the electrical contacts 127, 129 by means of the second DC voltage supply 109 can be transmitted via the wires of the second wire pair in the plugged-in state. In this case, transmitting means that the DC voltages can be transmitted by means of the data cable 103 to a load module that is connected to the input/output module 105 by means of the data cable. The load module is, for example, at least partly configured analogously to the input/output module 105. That is to say that such a load module, analogously to the input/output module 105, has an appropriate socket 121 so that the data cable 103 can be connected to the load module by means of a second plug. The load module also has a physical interface and capacitive and inductive assemblies in order to be able to receive both a DC voltage and a data signal, or DC voltages and data signals, via appropriate lines. The load module comprises particularly a second socket to which a data cable can again be connected in order to connect another, third, load module. The second load module is, for example, configured to forward a DC voltage or DC voltages, which are provided to this second load module by means of the data cable 103, to the third load module. The same applies to a first and a second differential data signal. This principle can be applied to further load modules, which means that a multiplicity of load modules are connected to the input/output module 105 via multiple data cables. Since the input/output module 105 can supply DC voltages to a bus system of such design, the input/output module 105 can also be referred to as a supply module.

The input/output module 105 comprises, as shown in FIG. 1, a microcontroller unit 211. The plug 183 comprises, as shown in FIG. 1 in conjunction with FIG. 2, a further microcontroller unit 193. The microcontroller unit 211 is configured to communicate with the microcontroller unit 193. Analogously, the further microcontroller unit 193 is configured to communicate with the microcontroller unit 211. The two microcontroller units 193, 211 are therefore communication subscribers.

The microcontroller unit 211 is connected to the electrical contacts 123, 125, 127, 129 via four lines 213, 215, 217, 219, as explained below.

The electrical line 213 connects the microcontroller unit 211 to the line section 131 that connects the physical interface 111 to the second transformer 115, this electrical line 131 connecting the physical interface 111 to the fourth electrical contact 129 indirectly via the second transformer 115 and the capacitor 139. Therefore, the microcontroller unit 211 is thus connected to the fourth electrical contact 129 indirectly by means of the line 213.

The microcontroller unit 211 is further indirectly connected to the third electrical contact 127 by means of an electrical line 215 as follows. The electrical line 215 connects the microcontroller unit 211 to the electrical line 131 that connects the physical interface 111 to the second transformer 115, this electrical line 131 connecting the physical interface 111 to the third electrical contact 127 via the capacitor 137 of the second capacitive assembly 119 and via the line 145.

The microcontroller unit 211 is connected by means of the electrical line 217 to the electrical line 131 that connects the physical interface 111 to the first transformer 113, this electrical line then connecting the physical interface 111 to the second electrical contact 125 indirectly via the first transformer 113, the capacitor 135 of the first capacitive assembly 117 and via the electrical line 143.

The microcontroller nit 211 is connected via the electrical line 219 to the electrical line 131 that connects the physical interface 111 to the first transformer 113, this electrical line 131 connecting the physical interface 111 to the first electrical contact 123 via the first transformer 113, the capacitor 133 of the first capacitive assembly 117 and via the electrical line 141.

Therefore, the microcontroller unit 211 is thus connected to the first electrical contact 123 and the second contact 125 via the first transformer 113 via the first capacitive assembly 117. The microcontroller unit 211 is connected to the third electrical contact 127 and the fourth electrical contact 129 via the second transformer 115 and the second capacitive assembly 119.

Therefore, the microcontroller unit 211 can apply differential data signals to the electrical contacts 123, 125, 127, 129, for example.

The further microcontroller unit 193 is connected to the wire 181 of the second wire pair via an electrical line 195. In this case, this line 195 has a capacitor 203 connected in it. The further microcontroller unit 193 is connected to the wire 179 of the second wire pair via a line 197. In this case, a capacitor 205 is connected in this line 197. The two capacitors 203, 205 form a third capacitive assembly. Therefore, the further microcontroller unit 193 is connected to the second wire pair via a third capacitive assembly. A differential data signal that is transmitted via this second wire pair can therefore be received by means of the further microcontroller unit 193. Conversely, the further microcontroller unit 193 can transmit a differential data signal via the second wire pair to the microcontroller unit 211 via the third capacitive assembly. Therefore, the second wire pair allows communication between the two microcontroller units 193, 211.

The further microcontroller unit 193 is connected to the wire 177 of the first wire pair by means of a line 199. The microcontroller unit 193 is connected to the wire 175 of the first wire pair by means of an electrical line 206.

The line 199 has an inductance 207 connected in it that is a coil, for example. The line 206 has an inductance 209 connected in it that is a coil, for example.

The two inductances 207, 209 form a third inductive assembly. Therefore, the further microcontroller unit 193 is connected to the wires of the first wire pair via the third inductive assembly. Thus, if the first DC voltage supply 107 applies a DC voltage to the first electrical contact 123 and the second electrical contact 125, said DC voltage can, in the plugged-in state, be transmitted onward to the further microcontroller unit 193 via the third inductive assembly. That is to say, then, that a DC voltage supply for the further microcontroller unit 193 has been made possible via the two wires 175, 177 of the first wire pair.

The microcontroller unit 211 is configured to actuate the first and second DC voltage supplies 107, 109 such that they apply a respective DC voltage to the applicable electrical contacts 123, 125, 127, 129 only if the microcontroller unit 211 has been able to communicate with the further microcontroller unit 193. Thus, if a data cable is used that does not have a further microcontroller unit 193 of this kind, then no communication will be able to take place in this case. This is then a sign for the microcontroller unit 211 that a load module, generally a portion of the bus system 101, that is, or has been, connected to the input/output module 105 by means of the data cable does not have what is known as a "Power over Ethernet" functionality. That is to say, then, that this further subscriber cannot be provided with DC voltages via the data cable. Accordingly, the microcontroller unit 211 then actuates the two DC voltage supplies 107, 109 such that they do not apply a DC voltage to the electrical contacts 123, 125, 127, 129 at the present time. This can advantageously prevent damage or destruction of communication components of the further subscriber.

FIG. 2 shows an isolated view of a detail from the bus system 101 of FIG. 1.

Depicted in more detail is the socket 121 having the four electrical contacts 123, 125, 127, 129. Around the two lines 141, 143, a dashed oval with the reference symbol 221 is shown. This is meant to symbolize that the two lines 141, 143 form a first communication channel. This first communication channel is thus used to transmit a first differential data signal. In the plugged-in state, this first communication channel is continued via the first wire pair comprising the wires 175, 177 of the data cable 103.

Analogously, an oval depicted in dashes and having the reference symbol 223 is shown around the line 145, 147, this being meant to symbolize that these two lines form a second communication channel. That is to say that the second differential data signal is transmitted via this second communication channel. In the plugged-in state, this second communication channel is continued by means of the second wire pair comprising the wires 179, 181.

Therefore, two-channel communication between the input/output module 105 and a further subscriber of the bus system is via the data cable 103 thus advantageously possible. The data cable 103 can be used to transmit particularly first and second differential data signals and also DC voltages.

In an embodiment, there is provision for the further microcontroller unit 193 to be connected to the first wire pair only via the third inductive assembly, as shown in FIG. 2. In this embodiment, the third capacitive assembly and the applicable lines 195, 197 are therefore missing. In this case, an electronic data memory, particularly a PROM, is used instead of the further microcontroller unit 193. For a communication with the PROM, the first communication channel is sufficient.

Provision of a further microcontroller unit 193 as a communication subscriber for the microcontroller unit 211 has particularly the advantage that complete electronic datasheets can be stored as in a normal PROM. On the other hand, a further microcontroller unit of this kind can log, that is to say record or document, basic information. A quite significant advantage, however, is the capability of the further microcontroller unit to drop into a deep sleep mode after a communication with the microcontroller unit 211, which means that this further microcontroller unit no longer interferes with a communication between the physical interface 111 of the input/output module 105 and a further physical interface of a further subscriber.

A refinement of the method comprises the following, for example:

In a first step, the subscribers of the bus system are switched on. That is to say that the input/output module 105 is switched on. That is to say that the further subscriber connected to the input/output module 105 via the data cable 103 is switched on. The two lines 141, 143 of the first communication channel have a measurement voltage connected to them. This measurement voltage is connected by means of the first DC voltage supply 107, for example. For this purpose, the microcontroller unit 211 actuates the first DC voltage supply 107 accordingly, for example.

In a further step, a communication then takes place between the microcontroller unit 211 and the further microcontroller unit 193. That is to say that the microcontroller unit 211 attempts to set up a communication connection to the further microcontroller unit 193. If such a communication has been made possible via the second communication channel, the further microcontroller unit 193 can provide the microcontroller unit 211 with an electronic datasheet, for example. Therefore, the electrical and/or mechanical properties, the switching-on cycles and/or a temperature of the data cable 103 can be provided to the microcontroller unit 211 as information, for example.

In a further step, the further microcontroller unit 193 is then shut down, in particular it drops into a deep sleep mode or into a standby mode. This is particularly because the microcontroller unit 211 sends a standby signal to the further microcontroller unit 193 via the second communication channel.

If the communication has revealed that it is admissible to connect or switch on a supply voltage by means of the two DC voltage supplies 107, 109, the respective DC voltage is connected to the applicable electrical contacts 123, 125, 127, 129 in a further step.

If it is not possible for communication to be set up between the microcontroller unit 211 and the further microcontroller unit 193, for example because the further microcontroller unit 193 is not present in the data cable 103, then it is assumed that the connected subscriber does not have what is known as a "Power over Ethernet" functionality. In this respect, no DC voltages are connected.

The advantage of the further microcontroller unit 193 or else of a PROM is also particularly that the applicable electrical subassemblies are configured to be small enough to be integrated into the plug 183, particularly to be molded into it.

Figure 3:
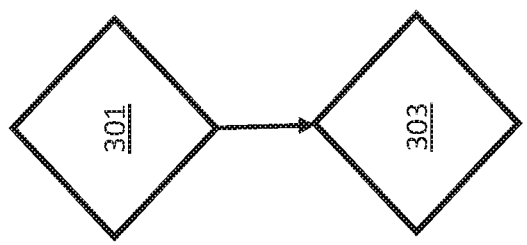
FIG. 3 shows a flowchart for a method for operating an input/output module.

FIG. 3 shows a flowchart for a method for operating an input/output module. This may be the input/output module 105 of FIG. 1, for example.

The method comprises the following steps:
using the microcontroller unit to check 301 whether a communication connection can be set up from the microcontroller unit to a communication subscriber of a data cable plugged into the socket,
using the microcontroller unit to actuate 303 the DC voltage supplies such that the DC voltage supplies apply a respective DC voltage to the applicable electrical contacts of the contact cups only if the check has revealed that a communication connection has been able to be set up to a subscriber of the data cable.

In automation engineering, various field bus protocols have become established on Ethernet at a data rate of 100 Mbit/s. Since Ethernet at a data rate of 1 Gbit/s has now established itself in the consumer sector, it makes sense for field bus protocols also to be transmitted at a data rate of 1 Gbit/s or 10 Gbit/s.

In contrast to the consumer sector, in which few subscribers transmit large volumes of data, in field bus engineering it is necessary for many subscribers to communicate with one another with few data. The delay for an Ethernet message in the case of standard Gbit engineering between two subscribers is approximately 1 μs, corresponding to the transmission time of 1000 bits.

On account of the larger number of subscribers in field bus engineering, these normally being connected to one another in line, the delay for a message from the sender to the receiver plays a much greater part.

A standard Ethernet interface connection with gigabit physics (1000-BASE-T) is shown schematically in a simplified view by the block diagram shown in FIG. 4.

Interface connection comprises a physical interface (also called PHY) 1001 and also a transmission and reception unit 1003. The contact point used, for example as a plug, is an RJ45 plug 1005, for example.

The interface used between the physical interface 1001 and the transmission and reception unit 1003 is usually what is known as the "Reduced Gigabit Media Independent Interface (RGMII)". This interface is subsequently simply referred to just as RGMII. In the case of the RGMII, four bits are transmitted in parallel at 250 Mbit/s each. The interface between the physical interface 1001 and a transformer 1007 connected between the RJ45 plug 1005 and the physical interface 1001, or the interface on the cable, is a signal for which five voltage levels are transmitted at 125 Mbaud (baud is the unit for 1 symbol per second) via each of four twin wires using the PAM-5 (PAM: pulse amplitude modulation) method. This results in a symbol quantity of $5^4=625$ (5 to the power of 4=625) that is transmitted at 125 Mbaud (the 625 different symbols are computationally equivalent to about 9.3 bits that are transmitted at 125 Mbaud, thus resulting in a gross data rate of 9.3 bits/symbol*125 Mbaud, that is to say about 1160 Mbit/s). Since a byte comprises only 256 symbols, the remainder of the symbols are used for error correction, as a result of which transmission links of up to 100 m between two subscribers are achieved (this results in the net data rate of 8 bits/symbol*125 Mbaud=1000 Mbit/s).

In full duplex mode, the twin wires are used bidirectionally, with the receiver deducting its transmitted signal in order to obtain the received signal.

The largest proportion of the transmission delay arises through the physical interface 1001, which converts the four bits of the RGMII interface into the symbols of the PAM-5 method.

The PAM-5 method is thus used to transmit signals or data between the RJ45 plug 1005 and the transformer 1007, or between the transformer 1007 and the PHY 1001.

In field bus engineering, it is the case that, for many applications, a shorter transmission link between two subscribers, that is to say between two input/output modules, for example, is sufficient here, as a result of which a simpler transmission method can be used, in which the signal to be transmitted is generated directly by the transmission and reception unit 1003, which means that a physical interface is not needed. As a result, it is advantageously possible for a transmission delay to be substantially shortened.

So as not to have to manufacture or develop devices, that is to say particularly input/output modules, having two different interfaces, the invention provides for a physical interface connection to comprise a switch that can be used to bypass the physical interface. As a result, it is advantageously possible for the same physical interface connection to be used both for standard Gbit physics and for a simpler transmission technique with a shorter range.

A second physical interface connection of this kind is realized in order to connect subscribers that have the same voltage potential to as few contacts as possible by means of a simple contact connection or plug connection. This interface connection involves the signals being transmitted bit by bit only via two connections per direction. This now requires only a transmitter and a receiver, which reduces firstly the hardware costs and secondly the transmission delay.

The switchable physical interface connection is realized in accordance with the block diagram shown in FIG. 5, for example.

There is provision for the transformer 1007 and the physical interface 1001 to have a switch 1101 provided between them that is configured as a high frequency switch, for example. Further, a line is formed from this switch 1101 that connects the switch 1101 to the transmission and reception unit 1003. The switch 1101 has two switching states. In the first switching state, the switch 1101 connects the transformer 1007 to the physical interface 1001. In the second switching state, the switch 1101 connects the transformer 1007 directly to the transmission and reception unit 1003. That is to say, then, that the physical interface connection shown in FIG. 5 has a switch 1101 integrated in it that can be used to connect the lines to the transformer 1007 either to the physical interface 1001 or directly to the transmission and reception unit 1003. The switch 1101 can therefore advantageously be used to bypass the PHY 1001.

A data transmission method between the switch 1101 and the transmission and reception unit 1003 can be performed by means of the "Special Transfer Method (STM)", for example.

For a connection between two subscribers, that is to say for example between two input/output modules, there are the following options:

1. One subscriber supports only standard Gbit transmission;
2. Both subscribers support both transmission methods, but the line length between the two subscribers is too great for the simple transmission method;
3. Both subscribers support both transmission methods, and the line length between the two subscribers is small enough for the simple transmission method.

Thus, according to one embodiment, a standard Gbit connection is first of all set up between the two subscribers. Subsequently, the respective other subscriber needs to be notified that a switchable physical interface connection is present. If both subscribers have the switchable physical interface connection, the distance between the two subscribers still needs to be established using a delay measurement. For example the delay can be ascertained in a manner similar to the IEEE 1588 method. An embodiment for performing a delay measurement is shown by the block diagram shown in FIG. 6, for example.

The figure shows two subscribers 1201, 1203, which may be configured as an input/output module, for example.

At the time t1_1, the subscriber 1201 sends a first message 1205 to the subscriber 1203. The message 1205 may be a SimplePhysicReq message, for example. In this case, the subscriber 1201 stores the transmission time t1_1 of the message 1205.

When the subscriber 1203 receives the message 1205, the subscriber 1203 stores the reception time t2_1 of the message 1205. The subscriber 1203 sends a further message 1207, which is configured as a SimplePhysicRes message, for example, back to the subscriber 1201 at the time t3_1. This message 1207 comprises the times t2_1 and t3_1.

The subscriber 1201 receives the message 1207 and stores the reception time t4_1 of the message 1207.

Analogously, the method described above is performed beginning with a subscriber 1203: the subscriber 1203 analogously sends a message 1205, for example a SimplePhysicReq message, to the subscriber 1201 at a time t1_2 and stores the transmission time t1_2 of the message 1205. When the subscriber 1201 receives the message 1205, the subscriber 1201 stores the reception time t2_2 of the message 1205. The subscriber 1201 sends a further message 1207, which is configured as a SimplePhysicRes message, for example, back to the subscriber 1203 at the time t3_2. This message 1207 comprises the times t2_2 and t3_2. The subscriber 1203 receives the message 1207 and stores the reception time t4_2 of the message 1207.

The two subscribers 1201, 1203 now each have four times t1_1 to t4_1 and t1_2 to t4_2, respectively.

The subscriber 1201 computes the delay as follows:

$$\text{Delay}=((t4\_1-t1\_1)-(t3\_1-t2\_1))/2$$

The subscriber 1203 computes the delay as follows:

$$\text{Delay}=((t4\_2-t1\_2)-(t3\_2-t2\_2))/2$$

The two subscribers 1201, 1203 take their respective ascertained delay as a basis for ascertaining or computing a distance between themselves and the other subscriber.

If the computed distance is below a permitted distance for simple transmission, then, according to one embodiment, the subscribers 1201, 1203 agree on this. In this respect, the two subscribers 1201, 1203 then switch to the simple transmission method. The reason is that both subscribers 1201, 1203 comprise a switchable interface connection as shown in the block diagram of FIG. 5. If the distance is above the permitted distance for simple transmission, then no switch is performed.

Figure 6:
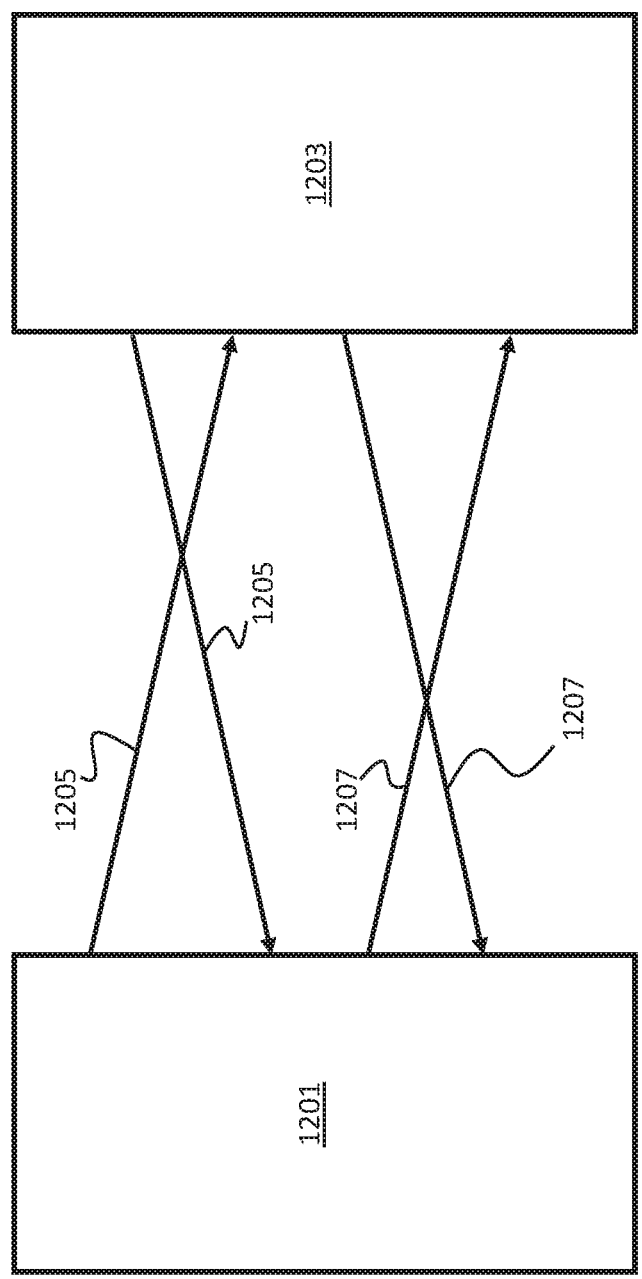
FIG. 6 shows a block diagram to ascertain a signal propagation time between two subscribes of a bus system.

In one embodiment, as an alternative or in addition to the delay measurement as described in connection with FIG. 6, the communication subscriber and/or the microcontroller unit provide the information concerning whether or not switching is necessary. The information provided comprises, for example, the information concerning what line type is involved, that is to say either an STM line or a standard Gbit line. That is to say that, according to one embodiment, the information described above is stored in the microcontroller unit and/or in the communication subscriber. Depending on the information provided, a switch then takes place, as described by way of example below.

Figure 7:
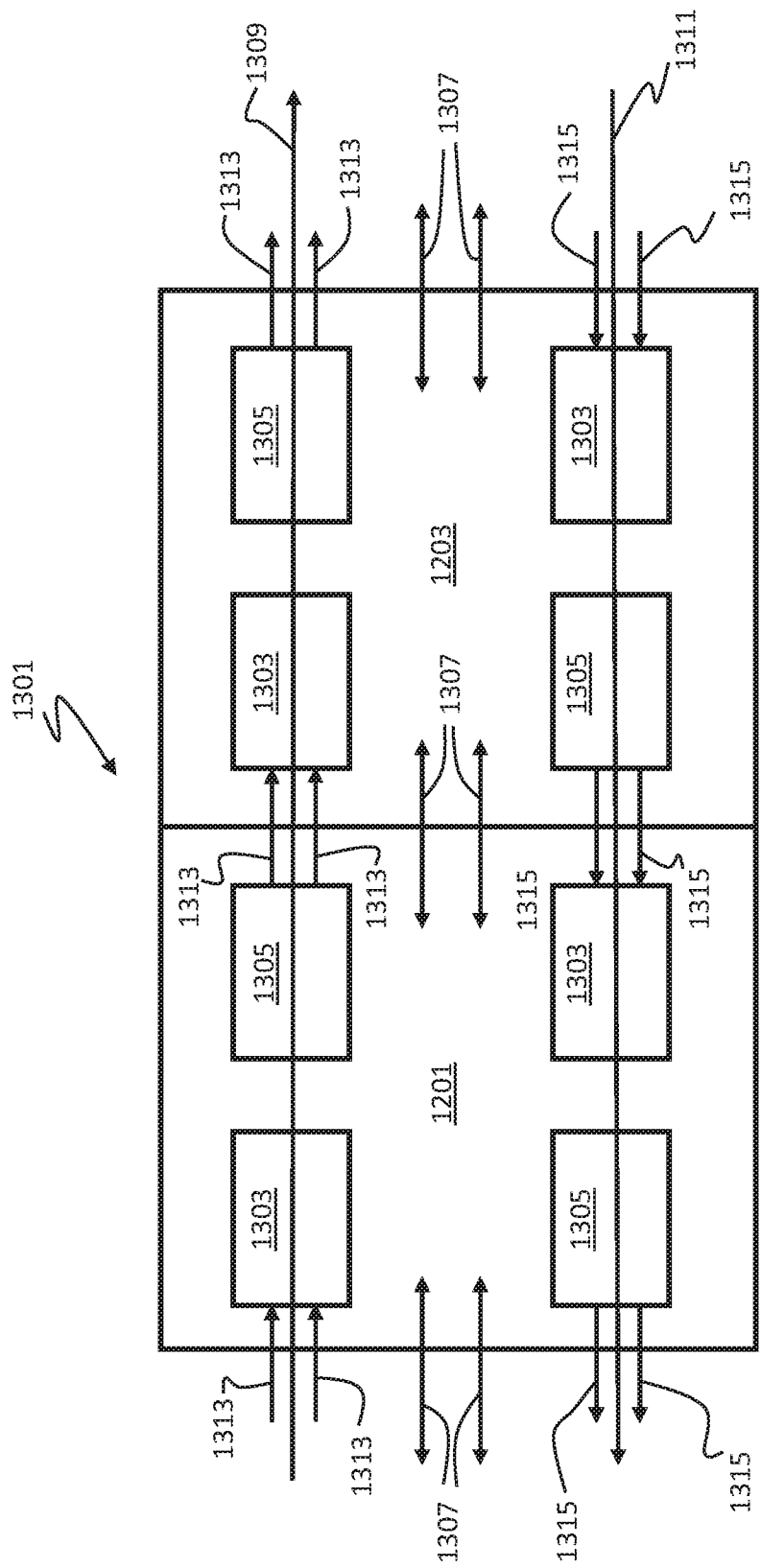
FIG. 7 shows a block diagram of a GBus.

FIG. 7 shows a block diagram of a Gbus 1301.

The Gbus is a pluggable physical connection to two subscribers, which may be configured as an input/output module, for example, with six lines, for example six wires, one line pair (wire pair) and another, third, line pair (third wire pair) of which per transmission direction are used for a voltage transmission.

The GBus 1301 shown in the block diagram of FIG. 7 is designed as follows:

Two subscribers 1201, 1203 are connected to one another via two wire pairs comprising two wires 1315 and two wires 1313, respectively. A third wire pair comprising two wires 1307 is depicted symbolically by means of double-headed arrows and likewise connects the two subscribers 1201, 1203 and is used for a voltage supply.

A first transmission direction from the subscriber 1201 and subscriber 1203 is depicted symbolically by means of an arrow with the reference symbol 1309. The transmission direction 1311 opposite to this transmission direction 1309, from the subscriber 1203 to the subscriber 1201, is depicted symbolically by means of an arrow with the corresponding reference symbol 1311. The wires for a data transmission in accordance with transmission direction 1309 are depicted symbolically by means of arrows with the reference symbols 1313. Wires of the wire pair for data transmission in accordance with the transmission direction 1311 are depicted symbolically by means of arrows with the reference symbols 1315.

For each transmission direction 1309, 1311, the subscribers 1201, 1203 comprise transmitters 1305 and receivers 1303. A signal transmission is effected bit by bit in accordance with the SerDes (serializer/deserializer) method, 8-bit useful data being transmitted as 10-bit symbols encoded at 1.25 Gbaud.

Since the Gbus 1301 no longer requires cables, transformers or physical interfaces between transmitter 1305 and receiver 1303, this interface connection is particularly inexpensive and has a minimal transmission delay.

Figure 8:
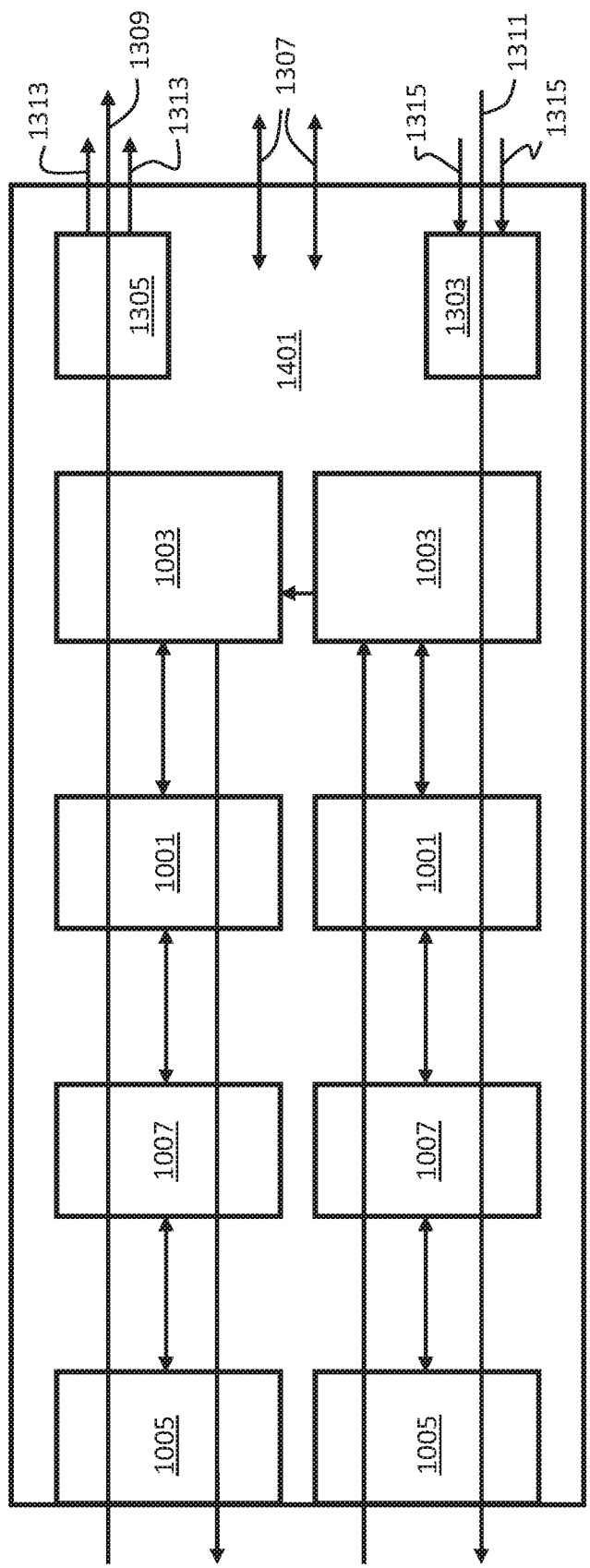
FIG. 8 shows a block diagram of a GBus converter.

FIG. 8 shows a block diagram of a Gbus converter 1401 in simplified form by way of example.

In order to be able to connect subscribers having a Gbus connection to standard Gbit subscribers too, a converter 1401 as shown in FIG. 8 is provided that converts either a switchable physical connection or the standard Gbit connection to Gbus. As shown in FIG. 8, the converter 1401 comprises two standard Gbit connections and one Gbus connection. The arrows depicted in FIG. 8 are meant to symbolically represent a data transmission direction, or a voltage transmission direction (in the case of the double-headed arrows 1307).

Figure 9:
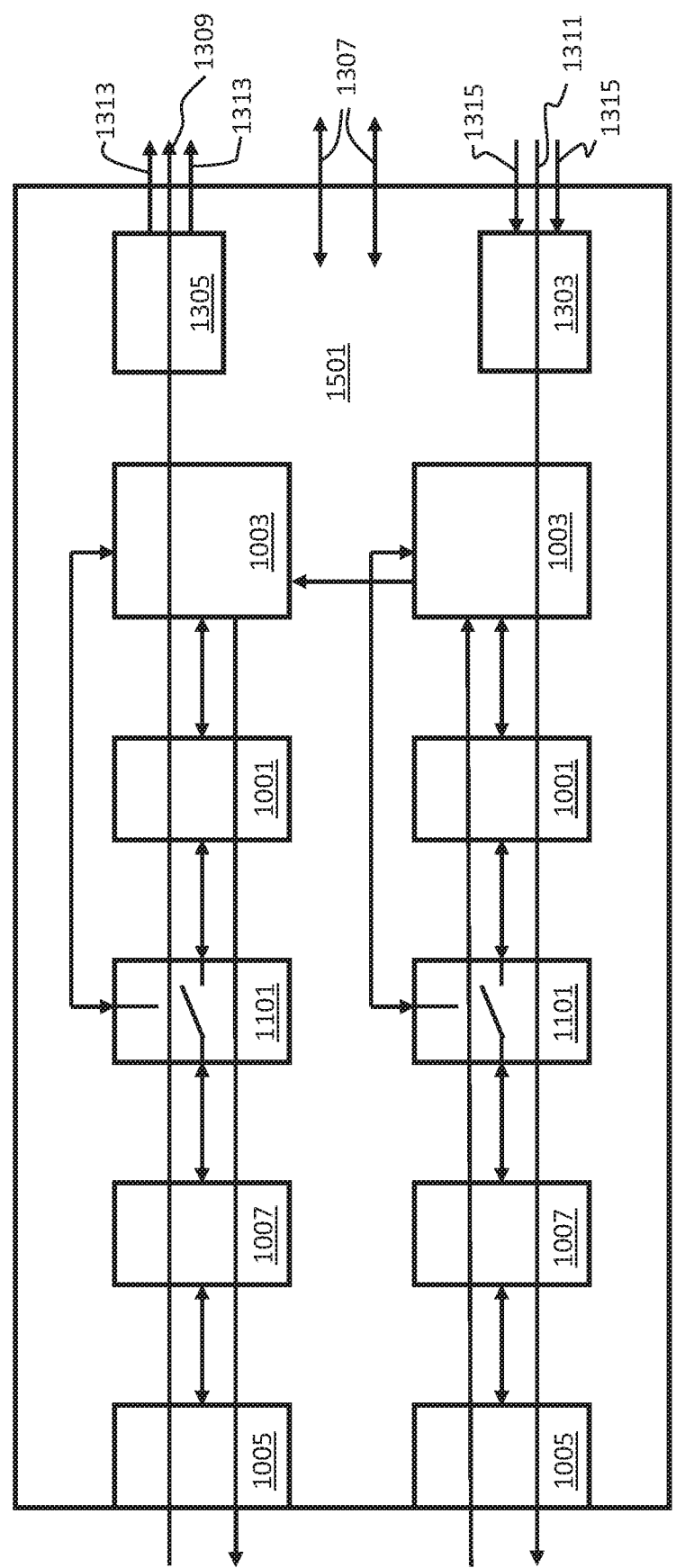
FIG. 9 shows a block diagram of a switchable GBus converter.

FIG. 9 shows a switchable Gbus converter 1501 that comprises two switches 1101 analogously to FIG. 5 in order to bypass the physical interface 1001. The arrows depicted in FIG. 9 are meant to symbolically represent a data transmission direction, or a voltage transmission direction (in the case of the double-headed arrows 1307).

There is therefore provision for other physical interfaces to be used for shorter distances, for example in order to be able to transmit EtherCAT at 1 Gbit/s, particularly 10 Gbit/s, with low latency. Further, according to one embodiment, a switchable connection (formed by the switch 1101) is provided that can switch between faster physical transmission with a shorter range and a standard Ethernet Gbit (10 Gbit/s or more), depending on the connected subscribers.

The switch 1101 described in connection with the embodiments given above is provided for the input/output module 105 of FIG. 1, for example, in order to bypass the physical interface 111 there in line with the block diagrams of FIGS. 5 and 9.

The criterion for the switching is based particularly on the information provided by means of the communication subscriber and/or by means of the microcontroller unit. The data transmission method (with/without PHY) is thus selected on the basis of the data cable type, for example, which is stored in the electronic datasheet, for example.

This invention has been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

What is claimed is:

1. A bus system, comprising:
   a data cable having two wire pairs,
   wherein the data cable comprises a first portion of an electrical plug connection, the first portion comprising four first electrical contact elements,
   wherein the four first electrical contact elements are each electrically connected to one of the wires of the two wire pairs,
   wherein the data cable has a communication subscriber, an input/output module,
   wherein the input/output module has a first DC voltage supply, a second DC voltage supply, a physical interface, a first transformer, a second transformer, a first inductive assembly, a second inductive assembly, a first capacitive assembly, a second capacitive assembly and a second portion that is complementary to the first portion of the electrical plug connection, the second portion comprising four second electrical contact elements,
   wherein the four-second electrical contact elements each comprise an electrical contact,
   wherein the first DC voltage supply is connected to a respective electrical contact of two of the four-second electrical contact elements via the first inductive assembly,
   wherein the second DC voltage supply is connected to a respective electrical contact of two others of the four-second electrical contact elements via the second inductive assembly, wherein the physical interface is connected to the respective electrical contacts of the two of the four second electrical contact elements via the first transformer and via the first capacitive assembly in order to apply a first differential data signal to the two electrical contacts of the two of the four second electrical contact elements, wherein the physical interface is connected to the respective electrical contacts of the two others of the four second electrical contact elements via the second transformer and via the second capacitive assembly in order to apply a second differential data signal to the two electrical contacts of the two others of the four second electrical contact elements, wherein the input/output module comprises a microcontroller unit, wherein the microcontroller unit is configured to communicate with the communication subscriber of the data cable, wherein the microcontroller unit is configured to actuate the first and second DC voltage supplies such that they apply a respective DC voltage to the applicable electrical contacts of the four second electrical contact elements only if the microcontroller unit has been able to communicate with the communication subscriber of the data cable, so that a respective DC voltage is not applied in the absence of the communication and/or in the absence of a communication subscriber in the data cable.

2. The bus system according to claim 1, wherein the first portion of the electrical plug connection is configured as a plug comprising the four first electrical contact elements, the four first electrical contact elements each being configured as an electrical contact pin, wherein the second portion of the electrical plug connection is configured as a socket having the four second electrical contact elements, the four second electrical contact elements each being configured as a contact cup, or vice versa.

3. The bus system according to claim 1, wherein
the microcontroller unit is connected to the respective electrical contacts of the two of the four second electrical contact elements via the first transformer and the first capacitive assembly and/or to the respective electrical contacts of the other two of the four second electrical contact elements via the second transformer and the second capacitive assembly in order to be able to apply data signals for a communication with the communication subscriber to the applicable electrical contacts, wherein the communication subscriber is connected to at least one of the four wires of the two wire pairs in order to be able, in the plugged-in state, to receive the data signals of the microcontroller unit and/or to send data signals to the microcontroller unit via the at least one wire.

4. The bus system according to claim 3, wherein the communication subscriber is connected to the one of the two wire pairs via a third capacitive assembly and to the other of the two wire pairs via a third inductive assembly.

5. The bus system according to claim 3, wherein the microcontroller unit is configured to apply a supply voltage for the communication subscriber to electrical contacts of the second electrical contact elements, the supply voltage being lower than the DC voltages that can be applied to the electrical contacts of the second electrical contact elements by means of the first and second DC voltage supplies.

6. The bus system according to claim 1,
wherein the microcontroller unit is configured to send a standby signal to the communication subscriber,
wherein the communication subscriber is configured to change to a standby state in response to the standby signal.

7. The bus system according to claim 1,
wherein the communication subscriber comprises a data memory that stores an electronic datasheet of the communication subscriber,
wherein the microcontroller unit is configured to read the electronic datasheet from the data memory and to control operation of the input/output module based on the read datasheet.

8. The bus system according to claim 1, wherein the communication subscriber is configured as a further microcontroller unit or as a programmable read-only memory.

9. An input/output module for a bus system, comprising:
a first DC voltage supply, a second DC voltage supply, a physical interface, a first transformer, a second transformer, a first inductive assembly, a second inductive assembly, a first capacitive assembly, a second capacitive assembly and a portion of an electrical plug connection, the one portion comprising four electrical contact elements,
wherein the four electrical contact elements each comprise an electrical contact,
wherein the first DC voltage supply is connected to a respective electrical contact of two of the four electrical contact elements via the first inductive assembly,
wherein the second DC voltage supply is connected to a respective electrical contact of two others of the four electrical contact elements via the second inductive assembly,
wherein the physical interface is connected to the respective electrical contacts of the two of the four electrical contact elements via the first transformer and via the first capacitive assembly in order to apply a first differential data signal to the two electrical contacts of the two of the four electrical contact elements,
wherein the physical interface is connected to the respective electrical contacts of the two others of the four electrical contact elements via the second transformer and via the second capacitive assembly in order to apply a second differential data signal to the two electrical contacts of the two others of the four electrical contact elements,
wherein the input/output module comprises a microcontroller unit,
wherein the microcontroller unit is configured to communicate with a communication subscriber of a data cable,
wherein the microcontroller unit is configured to actuate the first and second DC voltage supplies such that they apply a respective DC voltage to the applicable electrical contacts of the four electrical contact elements only if the microcontroller unit has been able to communicate with the communication subscriber of the data cable, so that a respective DC voltage is not applied in the absence of communication and/or in the absence of a communication subscriber in the data cable.

10. The input/output module according to claim 9, wherein the one portion of the electrical plug connection is configured as a plug comprising the four electrical contact elements, the four electrical contact elements each being configured as an electrical contact pin, or wherein the one portion of the electrical plug connection is configured as a socket having the four electrical contact elements, the four electrical contact elements each being configured as a contact cup.

11. The input/output module according to claim 9, wherein the microcontroller unit is connected to the respective electrical contacts of the two of the four electrical contact elements via the first transformer and the first capacitive assembly and/or to the respective electrical contacts of the other two of the four electrical contact elements via the second transformer and the second capacitive assembly in order to be able to apply data signals for a communication with the communication subscriber to the applicable electrical contacts.

12. The input/output module according to claim 11, wherein the microcontroller unit is configured to apply a supply voltage for the communication subscriber to electrical contacts of the electrical contact elements, the supply voltage being lower than the DC voltages that can be applied to the electrical contacts of the electrical contact elements by means of the first and second DC voltage supplies.

13. The input/output module according to claim 9, wherein the microcontroller unit is configured to send a standby signal to the communication subscriber.

14. The input/output module according to claim 9, wherein the microcontroller unit is configured to read an electronic datasheet from a data memory of the communication subscriber and to control operation of the input/output module based on the read datasheet.

15. A data cable for a bus system, comprising:
two wire pairs,
a portion of an electrical plug connection, the one portion comprising four electrical contact elements,
wherein the one portion of the electrical plug connection is configured as a plug comprising the four electrical contact elements, the four electrical contact elements each being configured as an electrical contact pin, or wherein the one portion of the electrical plug connection is configured as a socket having the four electrical contact elements, the four electrical contact elements each being configured as a contact cup,
wherein the four electrical contact elements are each electrically connected to one of the wires of the two wire pairs,
wherein the data cable has a communication subscriber for a communication with a microcontroller unit of an input/output module.

16. The data cable according to claim 15, wherein the communication subscriber is connected to at least one of the four wires of the two wire pairs in order to be able, in the plugged-in state, to receive data signals of the microcontroller unit via the at least one wire and/or to send data signals to the microcontroller unit via the at least one wire.

17. The data cable according to claim 16, wherein the communication subscriber is connected to the one of the two wire pairs via a third capacitive assembly and to the other of the two wire pairs via a third inductive assembly.

18. The data cable according to claim 15, wherein the communication subscriber is configured to change to a standby state in response to a standby signal.

19. The data cable according to claim 15, wherein the communication subscriber is configured as a further microcontroller unit or as a programmable read-only memory.

20. A method for operating an input/output module, comprising the following steps:
using a microcontroller unit of the input/output module to check whether a communication connection can be set up from the microcontroller unit to a communication subscriber of a data cable plugged into a portion of an electrical plug connection of the input/output module, wherein the communication subscriber is connected to at least one of four wires of two wire pairs in order to be able, in the plugged-in state, to receive data signals of the microcontroller unit via the at least one wire and/or to send data signals to the microcontroller unit via the at least one wire,
using the microcontroller unit of the input/output module to actuate DC voltage supplies of the input/output module such that the DC voltage supplies apply a respective DC voltage to applicable electrical contacts of electrical contact elements of the input/output module only if the check has revealed that a communication connection has been able to be set up to the communication subscriber of the data cable.

* * * * *